United States Patent [19]

Woollenweber et al.

[11] Patent Number: 4,885,911
[45] Date of Patent: Dec. 12, 1989

[54] INTERNAL COMBUSTION ENGINE TURBOSYSTEM AND METHOD

[76] Inventors: William E. Woollenweber, 3169 Camino del Arco, La Costa, Calif. 92009-7856; Niels J. Beck, 4073 The Hill Rd., Bonita, Calif. 92109

[21] Appl. No.: 159,840

[22] Filed: Feb. 24, 1988

[51] Int. Cl.$^4$ .............................................. F01P 5/08
[52] U.S. Cl. ...................................... 60/597; 60/316; 123/41.49
[58] Field of Search .................... 60/597, 599, 605.1, 60/605.3, 614, 607, 608, 316; 123/41.11, 41.12, 41.42, 41.65, 41.49, 196 AB, 563

[56] References Cited

U.S. PATENT DOCUMENTS

| | | | |
|---|---|---|---|
| 1,244,442 | 10/1917 | Frazer | 123/41.49 |
| 1,277,735 | 9/1918 | LaPorte | 60/597 |
| 1,752,224 | 3/1930 | Apple | 60/607 X |
| 2,045,816 | 6/1936 | Yingling | 60/605.1 |
| 2,194,913 | 3/1940 | Rossi | 60/597 |
| 2,277,839 | 3/1942 | Becht | 60/605.1 |
| 2,703,561 | 3/1955 | Froehlich | 123/563 |
| 2,874,642 | 2/1959 | Forrest | |
| 2,944,786 | 7/1960 | Angell et al. | |
| 3,137,477 | 6/1964 | Kofink | |
| 3,557,549 | 1/1971 | Webster | |
| 3,614,259 | 10/1971 | Neff | 415/205 |
| 3,796,047 | 3/1974 | Crook et al. | 60/612 |
| 3,829,235 | 8/1974 | Woollenweber, Jr. | 415/143 |
| 3,946,565 | 3/1976 | Cutler | 60/599 |
| 3,994,620 | 11/1976 | Spraker, Jr. et al. | 415/145 |
| 4,010,613 | 3/1977 | McInerney | 60/599 |
| 4,062,188 | 12/1977 | Cutler et al. | 60/599 |
| 4,177,005 | 12/1979 | Bozung et al. | 415/128 |
| 4,380,971 | 4/1983 | Tholen et al. | 60/597 X |
| 4,565,505 | 1/1986 | Woollenweber | 417/407 |
| 4,653,275 | 3/1987 | Sumser et al. | 60/602 |
| 4,708,095 | 11/1987 | Luterek | 123/41.42 |

FOREIGN PATENT DOCUMENTS

| | | | |
|---|---|---|---|
| 2633587 | 2/1978 | Fed. Rep. of Germany | 60/602 |
| 1228357 | 3/1960 | France | 123/41.49 |
| 2338382 | 1/1976 | France | 60/605.1 |

OTHER PUBLICATIONS

Brockington, Paul, "Perkins Apply Charge Cooling to Turbocharged 6.354", *Commercial Motor*, Sep. 4, 1970.
Haggh, Bertil and Ernst Holmer, "Air-to-Air Charge Air Cooling for Truck Engines", Technical Paper Distributed at Society of Automotive Engineers, Inc., West Coast International Meeting, Aug. 6-9, 1979, SAE 790770.

*Primary Examiner*—Michael Koczo
*Attorney, Agent, or Firm*—Willian, Brinks, Olds, Hofer, Gilson & Lione

[57] ABSTRACT

An exhaust-driven cooling system for an internal combustion engine includes a turbocooler having an exhaust-driven turbine and fan means to generate a flow of cooling air for use in an internal combustion engine heat exchanger to dissipate heat losses of the engine. The system can provide internal combustion engines with substantially reduced temperatures and pressures for its exhaust gas and exhaust system components and substantially improved reliability and efficiency.

33 Claims, 4 Drawing Sheets

INTERNAL COMBUSTION ENGINE TURBOSYSTEM AND METHOD

TECHNICAL FIELD

This invention relates to exhaust-driven turbocooling systems in internal combustion engines and to the use of turbocompounding, including plural turbomachines and heat exchangers, in internal combustion engine systems to provide engine cooling and cooled charge-air to an engine for combustion.

BACKGROUND ART

Substantial heat losses are generated in the operation of an internal combustion engine, and these heat losses must be removed from the engine and dissipated to prevent engine temperatures that can destroy engine lubrication and parts. Water-to-air heat exchangers, commonly called "radiators", are predominantly used to cool internal combustion engines; and water or a water and antifreeze mixture is circulated through the engine as an engine-cooling fluid to absorb, through the inner surfaces of the internal combustion engine, the heat loss generated in the operation of the engine. The heated water is then delivered to the water-to-air heat exchanger or radiator where the heat is transferred from the water to air flowing through an engine radiator. The engine radiator is most frequently located in a position on the vehicle where air can be directed through the heat exchanger as a result of movement of the vehicle driven by the internal combustion engine. Because internal combustion engines are operated while stationary and in vehicles which are not in motion, an engine-driven fan is used to create air flow through the heat exchanger. With the internal combustion engines of vehicles, the radiator is most frequently positioned in front of the engine; and the fan is driven from the crank shaft of the engine. The efficiency of such fans is low, usually in the range of twenty-five percent due to poor blade design and poor air flow around the fan; and such fans drain engine power and reduce the overall efficiency of an engine.

Such water-cooled engines present the further disadvantage of an additional coolant, water, in addition to the oil that is used to lubricate the engine. Water, of course, freezes at 32° F. (0° C.); and the internal combustion engine must be protected against the expansion of freezing water by adding antifreeze into the water. Notwithstanding such protective actions, the use of water, or for that matter, any additional coolant, introduces into the internal combustion engine a further source of unreliable operation. Water introduces a source of corrosion, rust, and cylinder liner cavitation into the engine, and requires additional engine accessories such as pumps, radiators, hoses, belts, and fans.

Fuel consumption and power output are important factors in the operation of an internal combustion engine. The performance of an internal combustion engine can be improved by the introduction of a greater quantity of air, i.e., oxygen, into the combustion chambers of the engine cylinders for combustion. A greater quantity of oxygen in the air-fuel mixture permits more complete combustion, resulting in a greater power output for the engine, better fuel economy, and a reduction in the level of noxious emissions, such as residual hydrocarbons and carbon monoxides present in the exhausted gases.

Volumetric efficiency is a measure of the actual quantity of charge-air in the combustion chamber of an internal combustion engine at the end of the intake stroke relative to the amount of charge-air that could be in the chamber under normal atmospheric conditions. Non-supercharged engines must necessarily have a volumetric efficiency of less than one hundred percent because of the expansion of the charge-air in the combustion chamber due to its heating prior to the closing of the intake valve or valves and the inability to reach atmospheric pressure in the combustion chamber because of air pressure losses due primarily to the restricted intake valve openings. An increase in the volumetric efficiency of an internal combustion engine increases its overall operating efficiency.

One common method of increasing the air quantity available in the engine cylinder combustion chambers, which is referred to as "charge-air", is supercharging the combustion chambers through the use of one or more turbochargers. Another method is through the use of a charge-air cooler to cool the charge-air introduced into the chamber, thereby increasing the density of the air and the amount of oxygen to be introduced into the combustion chamber. A further method is using quick opening cams and multiple intake valves in each cylinder to reduce the throttling loss through the intake valves. Such methods increase the volumetric efficiency of an engine.

A turbocharged engine uses an exhaust-driven turbine coupled with a centrifugal compressor to compress ambient air to pressures above atmospheric pressure and to supply the compressed charge-air to the combustion chambers of the cylinders of the engine. This compression process increases the temperature of the air, and it is advantageous to use an aftercooler to cool the charge-air and further increase its density immediately prior to its introduction into the combustion chamber.

Charge-air cooling significantly improves the overall performance of an engine and has been in use for many years. Cooling of the charge-air after its compression by a turbocharger provides a higher charge-air weight to the combustion chamber, allowing the engine to burn more fuel, increasing the power output, improving fuel consumption, decreasing exhaust temperature, decreasing undesirable exhaust emissions, and so on. The lower starting temperature for the combustion process brought about by charge-air cooling can increase the life for the exhaust system, including the turbocharger, and can reduce the mechanical and thermal loads placed on the engine.

Various types of heat exchangers have been used with internal combustion engines to lower the temperature of the charge-air. Coolant-to-air heat exchangers are a type which uses the coolant fluid circulated through the engine block. Air-to-air heat exchangers are another type which use a flow of ambient air induced through the heat exchanger by vehicle motion or by an engine-driven fan to cool the charge-air. Water or a water and antifreeze mixture is the engine coolant most often used in a coolant-to-air-type aftercooler. In coolant-to-air-type heat exchangers, however, the temperature of the engine coolant is normally high; and the high temperature of the coolant limits the temperature to which the charge-air can be cooled. In an air-to-air-type heat exchanger, the lower temperature ambient air is used for cooling; and the temperature of the charge-air can generally be reduced to a level only 35°–54° F. (20°–30° C.) higher than the initial ambient air temperature.

In a turbocharged engine, the cooling air needed to cool the charge-air may be supplied by extending the inducer blades of the turbocharger compressor and ducting the air from the blade extensions through a separate ductway on the turbocharger to the charge-air aftercooler. Such a system is described in U.S. Pat. No. 3,829,235. A dual outlet compressor produces both the compressed charge-air and the cooling air flow to an air-to-air aftercooler for the charge-air. This system can provide quantities of cooling air for the charge-air to be provided to internal combustion engine cylinders; however, it is not capable of providing large volumes of cooling air required for other heat exchangers that may be used on an internal combustion engine.

DISCLOSURE OF INVENTION

This invention provides an exhaust-driven cooling system for an internal combustion engine system and, in a preferred embodiment, provides an "oil-only", internal combustion engine system with an exhaust-driven cooling system.

An internal combustion engine system of this invention includes a multi-cylinder internal combustion engine assembly, means for carrying its exhausted fuel-air mixture from the internal combustion engine assembly, and means for providing a flow of coolant from the engine to a heat exchanger to dissipate engine heat losses carried by the coolant prior to return of the coolant to the internal combustion engine assembly. In the invention, a "turbocooler" has a turbine connected with the means for carrying the exhausted fuel-air mixture from the internal combustion engine assembly so that the exhaust gas carried from the internal combustion engine assembly by the exhaust means drives the turbine of the turbocooler. The turbocooler also has a fan means turned by the turbine of the turbocooler, and the turbocooler fan means communicates with ambient air and generates a flow of cooling air. The internal combustion engine system is provided with means to direct the flow of cooling air generated by the turbocooler fan means through the heat exchanger to cool the coolant and dissipate the heat generated in operation of the internal combustion engine assembly. In a preferred embodiment of this invention, oil is used both as a lubricant and a coolant, providing an "oil-only", internal combustion engine assembly; and the internal combustion engine system is provided with means for providing a flow of lubricant to and from the internal combustion engine assembly for lubrication and for carrying heat losses generated by the operation of the internal combustion engine assembly away from the internal combustion engine assembly and to an oil cooler which serves as the coolant and lubricant heat exchanger. The cooling air generated by the turbocooler fan means is directed through the oil cooler to cool the lubricant and dissipate the heat generated in operation of the internal combustion engine assembly. This preferred embodiment of the invention eliminates water (and its disadvantages) as a coolant and provides an internal combustion engine system with a single working fluid (other than the fuel/air mixture used to drive the engine). In marine or amphibious applications, the need for salt water coolant can be eliminated.

In a further embodiment of the invention, the cooling air generated by the turbocooler fan means is directed from the coolant heat exchanger, or, in the preferred embodiment, oil cooler, back to the engine exhaust system; and the engine exhaust system is adapted to mix the cooling air with the engine exhaust prior to its leaving the exhaust system. With such improved internal combustion engine systems, the exhaust gas temperature can be reduced below 500° F. (260° C.), thereby substantially reducing its infrared emissions, making it harder to detect with infrared sensors. The internal combustion engine systems of this invention thus may be substantially advantageous in supplying motive power to military vehicles.

The invention may be incorporated into existing engines by the addition of a separate turbocooling device. Such a turbocooling device has a turbine and a fan means on a common rotatable shaft. The turbine and fan means of the turbocooling device may be designed to optimize their performance in using engine exhaust gas to produce a substantial flow of cooling air. The turbocooling device can be provided with connections permitting it to be incorporated conveniently into an existing internal combustion engine. For example, the turbocooling device can be provided with a turbine inlet adapted to be connected to the exhaust of the internal combustion engine and to direct the internal combustion engine exhaust to its turbine. The turbocooling device can also be provided with an inlet for its fan means adapted to be connected with ambient air and provided, if necessary, with a coarse air filter and an outlet adapted to be connected with means to direct the flow of cooling air to the internal combustion engine. The turbocooling device can also be provided with an exhaust for the turbine adapted to be connected with a cooling air return from the internal combustion engine and further adapted to mix the cooling air and exhaust from the turbine or otherwise cool the exhaust of the turbocooler turbine.

In systems of the invention, the cooling air generated by the fan means of a turbocooler can also be used to cool charge-air generated by a turbocharger or turbochargers used with the internal combustion engine assembly by providing the system with one or more charge-air coolers and means to direct the cooling air generated by the fan means of the turbocooler through the charge-air cooler or coolers. In preferred embodiments of systems including such charge-air cooling, ambient air is first drawn through a fine air cleaner and through the charge-air cooler or coolers by the fan means of the turbocooler before it is directed from the turbocooler for other uses, thereby providing the charge-air cooler or coolers with cooling air at or near the lowest possible temperature. The invention may further provide a system for supercooling the charge-air from a turbocharger or turbochargers that may be easily added to existing internal combustion engine systems. Such systems can include a first charge-air cooler, an additional turbomachine, frequently referred to as a charge-air compressor-expander, including a conventional compressor and an expander device, and a second charge-air cooler. In this system of the invention, compressed charge-air is delivered from the turbocharger(s) to the first charge-air cooler; and the system is provided with means to direct cooling air from the turbocooler fan means to the first charge-air cooler to cool the compressed charge-air, and means for delivering cooled compressed charge-air from the first charge-air cooler to the compressor of the charge-air compressor-expander where the compressor further compresses the charge-air. This system further includes means for delivering the further compressed charge-air from the compressor of the charge-air compressor-expander to the second charge-air cooler, means to direct cooling air from the turbocooler fan means to the second charge-air cooler for cooling the further compressed charge-air, and means for delivering the cooled, further compressed charge-air to the expander of the charge-air compressor-expander. The cooled, further compressed charge-air expands through the expander of the charge-air compressor-expander, further cooling the charge-air and driving the compressor of the charge-air compressor-expander. Finally, means are provided in the system for delivering the additionally cooled charge-air from the expander of the charge-air compressor-expander to the combustion chambers of the internal combustion engine. This system of the invention thus provides supercooled and compressed charge-air to the engine combustion chambers to substantially increase the weight of air and the quantity of oxygen available for combustion of the fuel-air mixture. The temperature of the supercooled charge air can be reduced to values below ambient temperature and can serve to further reduce the operating temperature of engine components such as pistons and exhaust valves.

An internal combustion engine system including all the above features of the invention includes an internal combustion engine assembly using only oil as both the lubricant and coolant, thereby eliminating the use of an additional coolant, generally water, and the attendant disadvantages. The engine is cooled by an exhaust-driven turbocooler. Thus, the engine system is provided with an oil cooler and means to pump oil from the engine to the oil cooler and, after the oil is cooled, back to the engine. Means are provided to connect the exhaust of the engine with the turbine of the turbocooler so that it drives the turbine and fan means of the turbocooler. As the turbocooler fan means is driven by the action of the engine exhaust gases on the turbocooler turbine, the turbocooler fan means generates a flow of cooling air from the ambient atmosphere that is directed initially to first and second charge-air coolers of a fuel-air system, then to the input of the turbocooler fan means, from the output of the turbocooler fan means to the oil cooler, and from the oil cooler back to a portion of the exhaust system adjacent the turbocooler where the cooling air is finally used to mix with and cool the exhaust gas from the turbocooler turbine prior to its release to atmosphere. Charge-air for the combustion chambers of the internal combustion engine is generated by one or two turbochargers which direct compressed charge-air to the first charge-air cooler, from the first charge-air cooler to the compressor of a charge-air compressor-expander, from the compressor of the charge-air compressor-expander to the second charge-air cooler, from the second charge-air cooler to the expander of the charge-air compressor-expander, and then from the expander of the charge-air compressor-expander to the combustion chambers of the internal combustion engine. Through the interaction of the cooling air from the turbocooler with the first and second charge-air coolers and the charge-air compressor-expander, the combustion cylinders of the internal combustion engine are provided with supercooled charge-air, increasing the ability of the engine to use more fuel more efficiently, increasing the power output of the engine, reducing the exhaust gas temperature and undesirable exhaust emissions, and providing an improvement in the life of the engine and its accessories as a result of the more efficient and reliable operation of the internal combustion engine.

BRIEF DESCRIPTION OF DRAWINGS

Preferred embodiments of this invention are described below in connection with the accompanying drawings, in which.

BEST MODE FOR CARRYING OUT THE INVENTION

Figure 1:
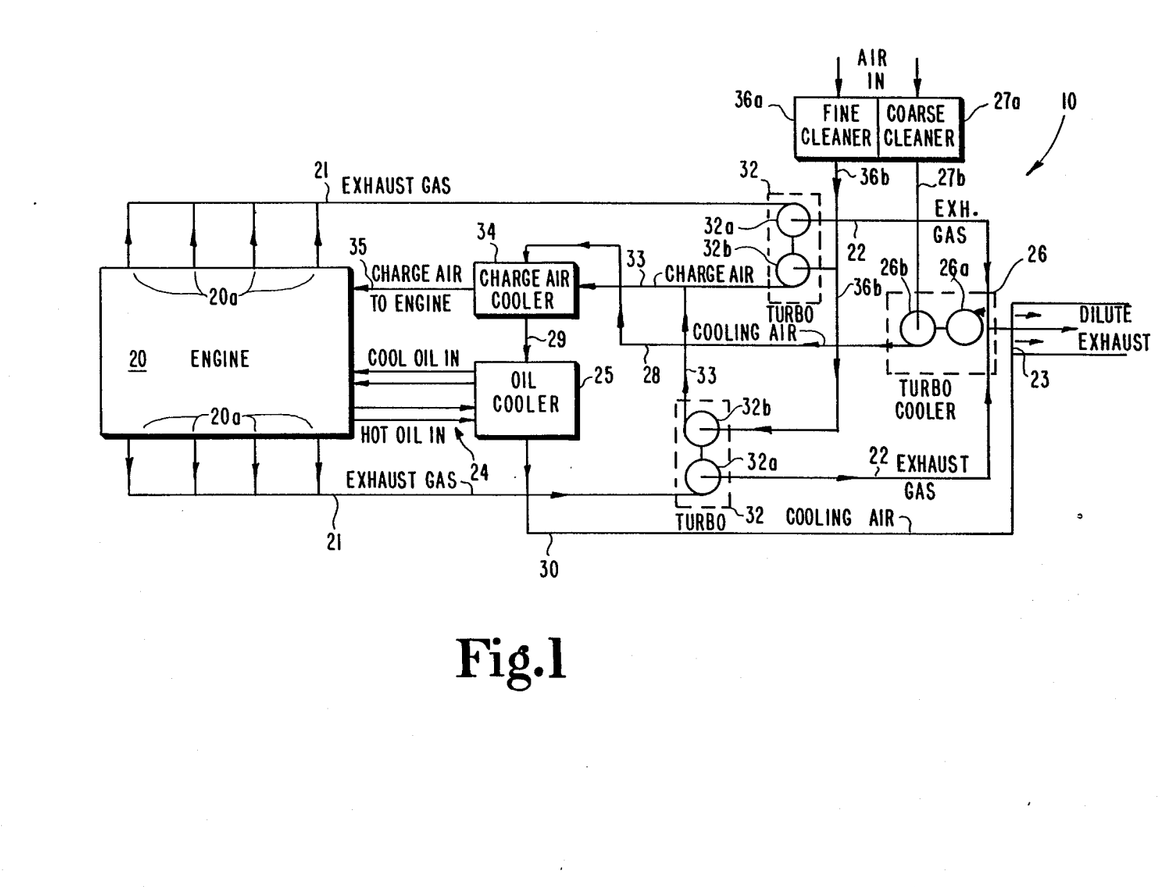
FIG. 1 is a schematic representation of an internal combustion engine system of this invention with an exhaust-driven cooling system.

As shown in FIG. 1, an internal combustion engine system 10 of this invention comprises an internal combustion engine assembly 20, means 21, 22, and 23 for carrying exhaust gas, that is, the products from the combustion of the fuel/air mixture, from the internal combustion engine assembly, means 24 for providing a flow of coolant to and from the internal combustion engine assembly, a coolant heat exchanger 25 connected with said means 24 for providing a flow of coolant to and from the internal combustion engine assembly 20, a turbocooler 26 having a turbine 26a connected with the means for carrying exhaust gas from the internal combustion engine, and a ducted fan means 26b driven by turbine 26a of turbocooler 26. In the internal combustion engine system of the invention, fan means 26b of the turbocooler communicates with ambient air of the atmosphere through, if necessary, a coarse air cleaner 27a; and the output of turbocooler fan means 26b is connected with means 28, 29 to direct the flow of cooling air generated by turbocooler fan means 26b through coolant heat exchanger 25 to cool the coolant and dissipate heat losses generated in operation of internal combustion engine 20. The system of FIG. 1 further comprises means 30 for directing the cooling air generated by the fan means of the turbocooler from coolant heat exchanger 25 to that portion 23 of the means for carrying the exhaust gas from the internal combustion engine assembly that is adjacent the output of turbocooler turbine 26a. The engine exhaust system portion 23 is adapted to cool the engine exhaust gas from turbocooler turbine 26a with the cooling air from means 30 and to lower its pressure prior to its leaving the exhaust system of the internal combustion engine.

Figure 2:
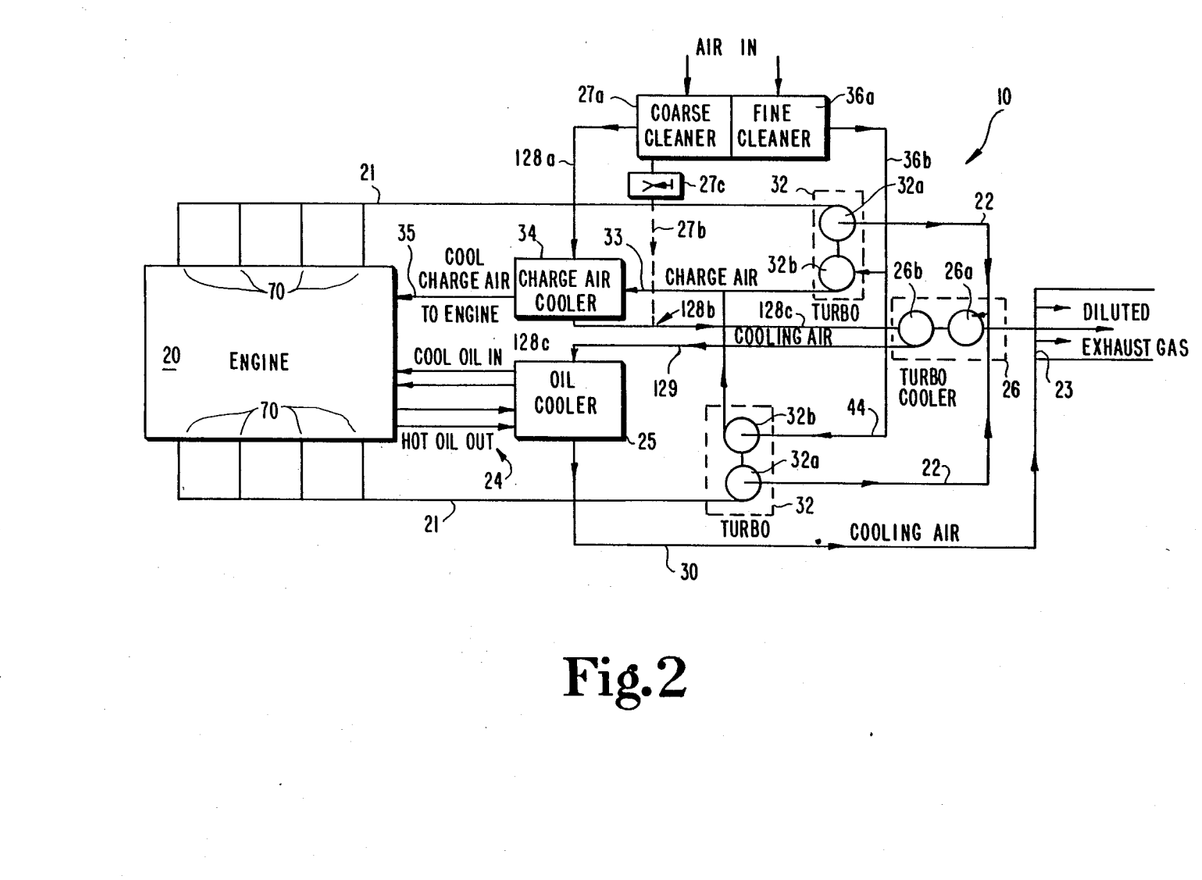
FIG. 2 is a schematic representation of a further internal combustion engine system of this invention with an exhaust-driven cooling system.
Figure 3:
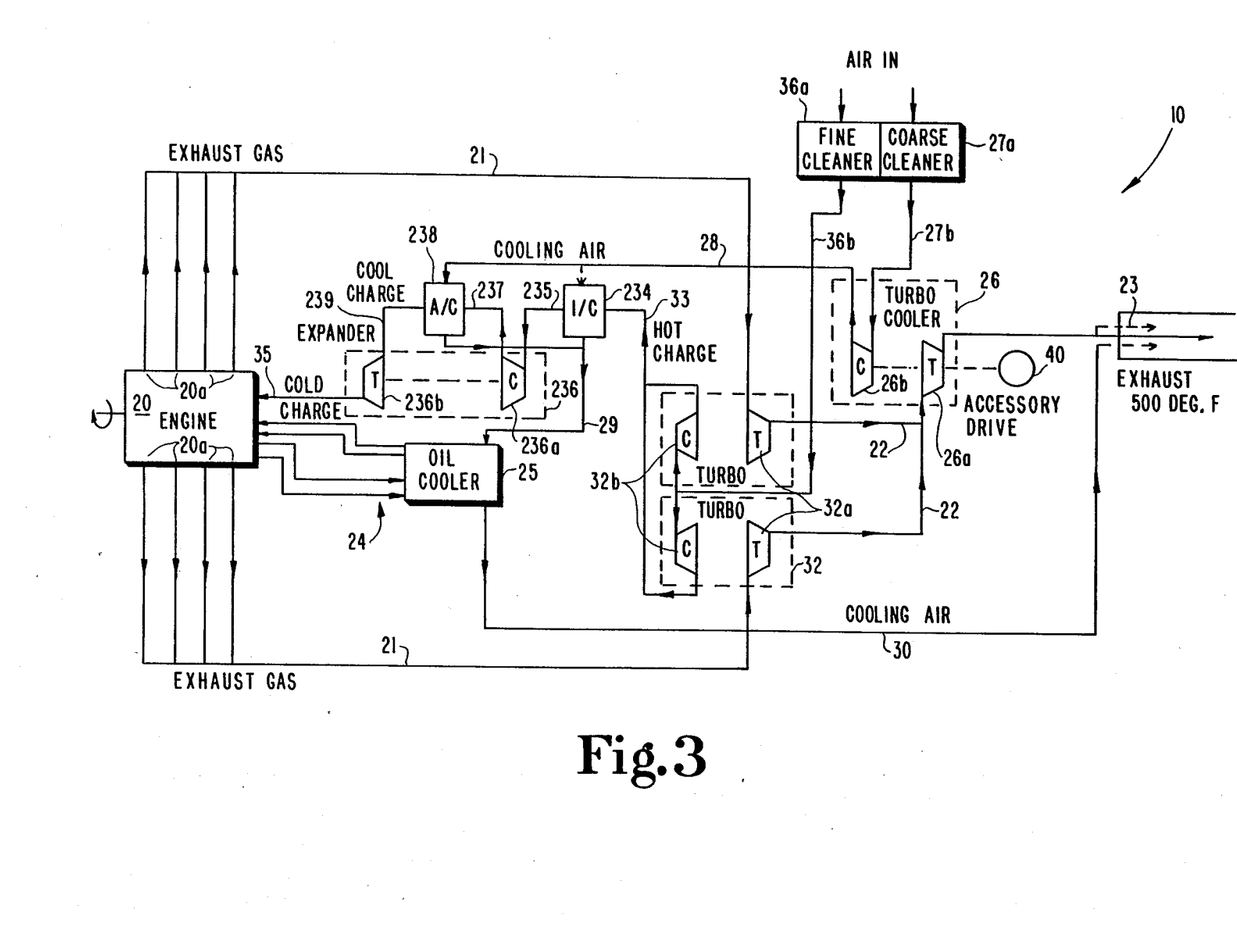
FIG. 3 is a schematic representation of a still further internal combustion engine system of this invention with both an exhaust-driven cooling system and a charge-air supercooling system.

The internal combustion system of FIG. 1 further comprises means for providing a mixture of fuel and air to the internal combustion engine assembly 20. The means for providing a fuel/air mixture to the engine comprises a turbocharger (or in V-type internal combustion engine systems as shown in FIGS. 1-3, two turbochargers) 32 having a turbine or turbines 32a connected with the means for carrying exhaust gas from the internal engine combustion assembly. The turbocharger or turbochargers 32 also have a compressor or compressors 32b that are driven by the turbine or turbines 32a of the turbochargers to create a flow of pressurized charge-air for delivery to cylinders 20a of internal combustion engine assembly 20. For convenience, the one or more turbochargers 32, turbines 32a, and compressors 32b of the described systems are referred to as turbocharger(s), turbine(s), and compressor(s); but such references are understood to mean the one or more turbochargers and their turbines and compressors that are used with internal combustion engine systems.

Turbocharger(s) 32 may be any turbocharger commonly used in internal combustion engine systems. Such turbochargers generally comprise an exhaust-driven turbine mounted on a common shaft with a centrifugal compressor. When exhaust gas is delivered to the turbine blades of the turbine, the exhaust gas provides a motive force rotating the turbine blades, the common shaft, and the centrifugal compressor. The compressor compresses ambient air present at its inlet above atmospheric pressure and produces a flow of compressed charge-air for delivery to the cylinders of an internal combustion engine. This compression process, however, generates heat in the compressed charge-air; and it is advantageous to remove heat from the compressed charge-air to increase its density prior to introduction into the cylinders of the internal combustion engine. An example of a preferred turbocharger is disclosed in U.S. Pat. No. 4,565,505, the disclosure which is incorporated herein by reference.

Means 33 directs the charge-air outputs of compressor(s) 32b of turbocharger(s) 32 to a charge-air cooler 34. As shown in FIG. 1, a means 28 for directing a flow of cooling air generated by the turbocooler directs the cooling air through charge-air cooler 34 prior to its direction to heat exchanger 25. The cooling air cools the compressed charge-air from turbocharger(s) 32 prior to direction of the charge-air to cylinders 20a of internal combustion engine assembly 20 through directing means 35. The inputs of compressor(s) 32b of turbocharger(s) 32 are connected with ambient atmosphere through means 36a and 36b, including a fine-air cleaner 36a.

During operation of system 10 shown in FIG. 1, exhaust gas from cylinders 20a of engine 20 is directed through exhaust duct 21 to turbine(s) 32a to drive compressor(s) 32b of turbocharger(s) 32 and, upon leaving turbine(s) 32a, through an exhaust duct 22 to turbine 26a of turbocooler 26. Where, as shown in FIG. 1, the internal combustion engine assembly is a V-type engine, that is, an engine with a V-shaped block having one set of cylinders in one side of the V-shaped block and another set of cylinders in the other side of the V-shaped block, the internal combustion system includes two turbochargers 32 and two sets of exhaust ducts 21 and 22. The exhaust gas from each set of exhaust ducts 22 combine their flows through turbine 26a of turbocooler 26. The exhaust gas drives turbine 26a and fan means 26b of turbocooler 26 and is then expelled through exhaust system portion 23.

Turbocooler 26 draws ambient air through intake means 27a and 27b which may include, if desirable or necessary, a coarse air cleaner 27a. The incoming air is compressed somewhat by fan means 26b of turbocooler 26 and is directed through means 28 to charge-air cooler 34 to cool the charge-air for the combustion chambers of internal combustion engine 20. The fan means 26b of the turbocooler may be designed to provide a pressure increase of about 2 psi. (140 gm/cm$^2$) and flow that is three times greater than the exhaust gas flow. The cooling air is further directed through means 29 to heat exchanger or oil cooler 25.

A particularly desirable internal combustion engine system of the invention uses oil for both lubricating and cooling internal combustion engine 20. This particularly desirable embodiment of the invention eliminates the use of water as a coolant and eliminates the radiator/fan combination predominantly used in internal combustion engines to dissipate the heat generated in the operation of the internal combustion engine. Thus, as shown in FIG. 1, means 24 provides a flow of lubricant to and from internal combustion engine assembly 20 for lubricating the internal combustion engine assembly and for carrying heat generated by operation of the internal combustion assembly away from the engine. Heat exchanger 25 is an oil cooler which is connected, as shown in FIG. 1, with the flow of cooling air to cool the lubricant and dissipate the heat carried by the lubricant away from the internal combustion engine prior to the return of the lubricant to the internal combustion engine assembly. The reliability of this improved internal combustion engine assembly is substantially improved by the elimination of water as a coolant, of the corrosive effects of water, of the danger of water freezing and of the need for antifreeze, of the need for an inefficient cooling fan and its energy drain on the engine output, and of the need for the miscellaneous additional spare parts and materials needed in the operation of an engine requiring different fluids for coolant and for lubrication.

As shown in FIG. 1, upon leaving oil cooler or heat exchanger 25, the cooling air is directed through exhaust duct means 30 to a point in the exhaust system of the internal combustion engine system adjacent turbocooler 26. Here, the cooling air is used in exhaust system portion 23 to further cool the hot engine exhaust from turbine 26a of turbocooler 26.

As noted above, in the means for providing a mixture of fuel and air to the internal combustion engine assembly, air is drawn from atmosphere through a fine-air cleaner 36a and further intake means 36b to compressor(s) 32b of turbocharger(s) 32. Compressor(s) 32b produces a flow of compressed charge-air through ducting means 33 to charge-air cooler 34. Charge-air cooler 34 is an air-to-air cooler in which heat is transferred from the compressed charge-air to the cooling air directed through charge-air cooler 34 from turbocooler 26. The cooling of the charge-air by the cooling air from turbocooler 26 provides the combustion chambers of internal combustion engine 20 with a flow of cool, dense charge-air, permitting more complete combustion of fuel-air mixture, increased power output, reduced noxious emissions, and improved operation, efficiency, and reliability for the internal combustion engine assembly.

As noted above, the cooling air is directed from heat exchanger or oil cooler 25 of the internal combustion engine system to exhaust system portion 23 through exhaust duct means 30. Exhaust system portion 23 may be arranged to provide an ejection action with the greater flow of cooling air at the exhaust duct of turbocooler turbine 26a, thereby mixing the cooling air with the exhaust gas leaving turbine 26a, diluting the exhaust gas, and lowering the back pressure throughout the exhaust system and at the combustion chambers of the engine. The cooling air is preferably ducted to surround the exhaust gas as it is expelled from the exhaust system to provide the exposed surface portions of the exhaust system duct with reduced temperatures. With such systems, the temperature of the exhaust gas being discharged to atmosphere may be less than 500° F. (260° C.) at maximum engine power. As noted above, the reduction in temperature of the exhaust gas and in surfaces of the exhaust system duct can be an important feature for the application of internal combustion engine systems of this invention to military vehicles because, in such systems, the vehicles are less easily detected by infrared sensing devices.

FIG. 2 shows an alternate embodiment of the internal combustion engine system of this invention. In the embodiment shown in FIG. 2, ambient air enters the engine and passes through charge-air cooler 34 prior to being directed to turbocooler fan means 26b. This embodiment provides the charge-air cooler with ambient air at about its ambient temperature, providing a large difference in the temperatures of the ambient cooling air and the compressed charge-air, thus enhancing the heat transfer in the charge-air cooler and providing a greater temperature reduction of the compressed charge-air. The alternate embodiment of FIG. 2 also includes components to introduce the ambient air directly into the fan means of the turbocooler, bypassing the charge-air cooler, for operation in situations where charge-air cooling may not be needed, such as in the winter. In the winter, for example, ambient air may be sufficiently cold that the use of cooling air in a charge-air cooler may be unnecessary.

As shown in FIG. 2, the internal combustion engine system of this alternate embodiment is the same as the internal combustion system in FIG. 1, except for the means to deliver ambient air to the fan means of the turbocooler and the means for directing cooling air from the fan means of the turbocooler to heat exchanger or oil cooler 25. As shown in FIG. 2, ambient air is drawn into the internal combustion engine system by the action of turbocooler fan means 26b through, if necessary, a coarse air cleaner 27a. The means for directing ambient air to fan means 26b of turbocooler 26 includes two paths. In one such path, the means directs the ambient cooling air through ducts 128a to charge-air cooler 34 and from charge-air cooler 34 through duct work 128c to the inlet of turbocooler fan means 26b. The other path of the means for directing ambient air to the inlet of turbocooler fan means 26b can include a bypass valve 27c and duct 27b, shown in dashed lines, which joins duct 128c at a union 128b.

In the operation of the internal combustion engine system of FIG. 2, bypass valve 27c may be opened, closed, or modulated. When bypass valve 27c is closed, which is normally the case, ambient air is directed through duct 128a to charge-air cooler 34, which is an air-to-air heat exchanger of the kind generally known in the art. The flow of cooling air from duct 128a cools the compressed charge-air in charge-air cooler 34 and is then directed through duct 128c to the inlet of turbocooler fan means 26b. Charge-air cooler 34 may be bypassed, however, by opening bypass valve 27c as may be the case when the ambient air is very cold, as in the winter. With bypass valve 27c open, the cooling air substantially entirely flows through bypass valve 27c and duct 27b to union 128b and duct 128c and is drawn into turbocooler fan means 26b. As shown in FIG. 2, the cooling air is directed from the outlet of turbocooler fan means 26b through a duct 129 to heat exchanger or oil cooler 25 to dissipate the heat generated in operation of internal combustion engine 20. In the same manner as shown in FIG. 1, the cooling air is then directed through duct 30 to exhaust system portion 23 for use in cooling and diluting the exhaust gas of the internal combustion engine.

A still further embodiment of this invention is shown in FIG. 3. The internal combustion engine system of FIG. 3 includes a turbomachine having a compressor and an expander used as a charge-air compressor-expander device to supercool engine charge-air prior to delivery to the cylinders of the internal combustion engine assembly. In this system, charge-air from the turbocharger is cooled by a first charge-air cooler, compressed by the compressor of the charge-air compressor-expander, then cooled again by the second charge-air cooler, and delivered to the expander of the charge-air compressor-expander where it expands, driving the compressor of the charge-air compressor-expander and further cooling the compressed charge-air by the expansion process to provide a flow of cold, compressed charge-air to the cylinders of the internal combustion engine.

Referring now to FIG. 3, exhaust gas from the engine is directed by means including exhaust gas ducts 21 to turbine(s) 32a of turbocharger(s) 32 to drive the compressor(s) 32b of the turbocharger(s). Compressor(s) 32b of turbocharger(s) 32 draw ambient air through a fine-air cleaner 36a and means including input duct 36b to the inputs of compressor(s) 32b. Compressed charge-air is directed from the outputs of compressor(s) 32b through means including duct 33 to a first charge-air cooler 234. First charge-air cooler 234 is an air-to-air heat exchanger which also receives cooling air from turbocooler fan means 26b through cooling air duct 28. The compressed charge-air is cooled by the cooling air in first charge-air cooler 234 and directed through a duct 235 to the input of compressor 236a of a charge-air compressor-expander 236. Compressor 236a of charge-air compressor-expander 236, which is driven by an expander 236b of the charge-air compressor-expander as set forth below, further compresses the cooled charge-air directed to compressor 236a through duct 235, and directs the further compressed charge-air through duct 237 to a second charge-air cooler 238. Second charge-air cooler 238 is also an air-to-air heat exchanger which receives cooling air from turbocooler fan means 26b through the cooling air duct 28. The further compressed charge-air from duct 237 is cooled in second charge-air cooler 238 by the cooling air from cooling air duct 28 and is directed through a further duct 239 to expander 236b of charge-air compressor-expander 236. The cooled, further compressed charge-air from duct 239 expands in expander 236b and drives compressor 236a of charge-air compressor-expander 236. In its expansion through expander 236b of charge-air compressor-expander 236, the charge-air becomes supercooled or cold while maintaining a significant compression above atmospheric pressure (e.g., about twice atmospheric pressure); and the supercooled, compressed charge-air is directed through duct 35 to the combustion chambers of cylinders 20a of internal combustion engine 20.

As in the systems of FIGS. 1 and 2, after delivering the exhaust gas of the internal combustion engine to turbocharger turbine 32a through exhaust ducts means 21, the exhaust gas is further directed through exhaust duct means 22 to the input of turbocooler turbine 26a. In passing through turbine 26a, the exhaust gas drives turbine 26a and fan means 26b of turbocooler 26, thereby generating the flow of cooling air to charge-air aftercoolers 234 and 238. Furthermore, as set forth in the systems of FIGS. 1 and 2, after leaving charge-air coolers 234 and 238, the cooling air is directed through a cooling air duct means 29 to heat exchanger or oil cooler 25 to cool the coolant or, in the case of an oil-only engine, to cool the oil, and dissipate the heat generated by internal combustion engine 20 during operation. Upon leaving heat exchanger or oil cooler 25, the cooling air is directed through cooling air duct means 30 and is used as described above to cool the engine exhaust that leaves the output of turbine 26a of turbocooler 26.

As shown in the system of FIG. 3, the shaft of turbocooler 26 can drive a high-speed, gear-reduction accessory drive 40, which may provide shaft speed reductions on the order, for example, of 10:1 to 30:1. The output of accessory drive 40 may be used to drive any one or more pumps, generators, or the other accessory devices used in internal combustion engine systems.

The system of this invention may, of course, also provide cooling air to a plurality of heat exchangers, preferably arranged in parallel, to receive cooling air from the turbocooler and provide additional cooling for various engine operating fluids.

Figure 4:
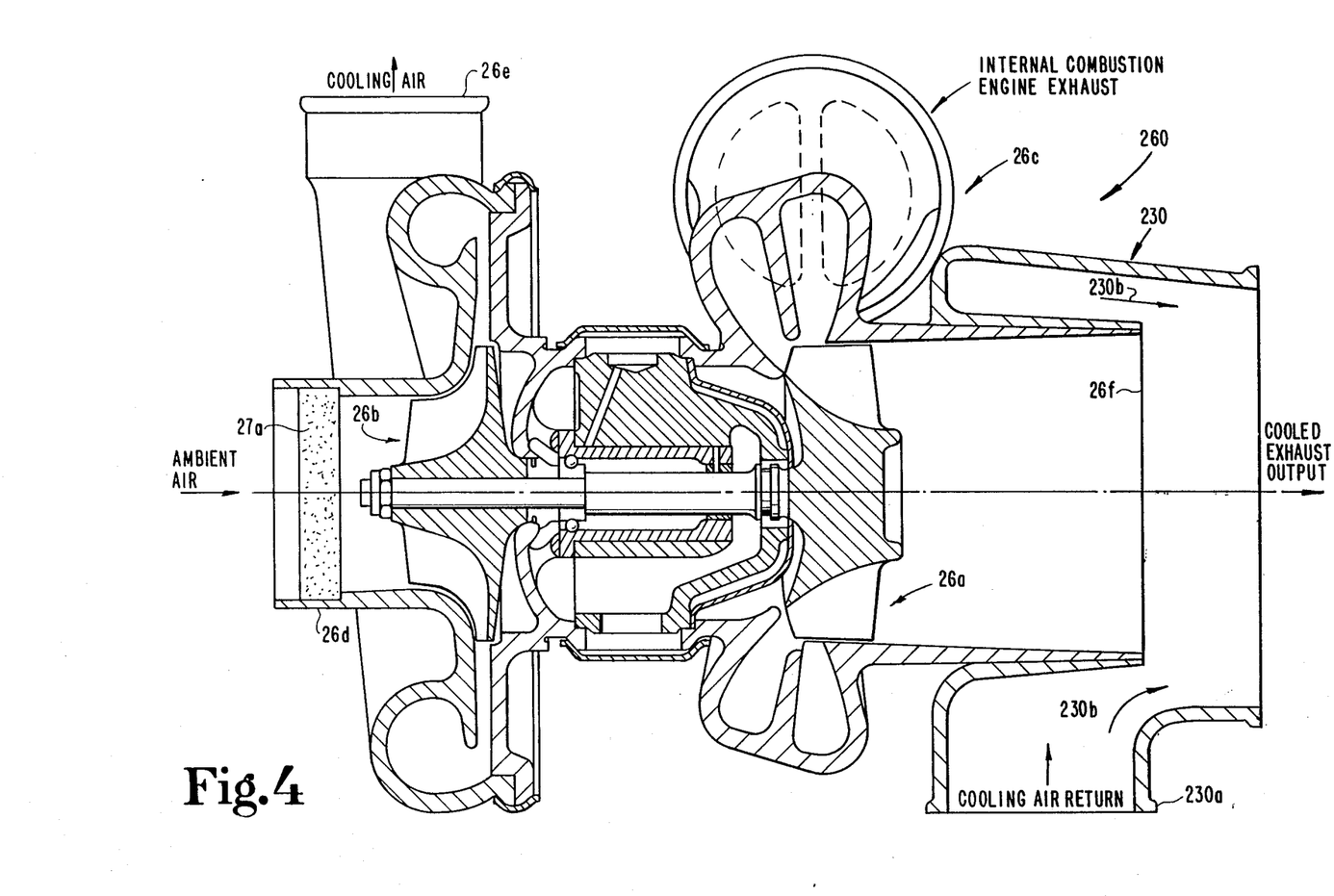
FIG. 4 is a diagrammatic drawing of a turbocooling device of this invention.

FIG. 4 shows a turbocooling device 260 by which the invention may be incorporated into existing internal combustion engine systems. As shown in FIG. 4, turbocooling device 260 includes a turbocooler having a turbine 26a and fan means 26b. Fan means 26b may be designed to produce a high rate of flow of cooling air at a pressure only slightly above atmospheric pressure; for example, a flow of about 150 pounds (0.45 kg.) per minute at about 2 psi. (140 gm/cm$^2$). Turbine inlet 26c is adapted to be connected with the exhaust system of the internal combustion engine; that is, referring to FIGS. 1–3, internal combustion inlet 26c is adapted to be connected to exhaust duct means 22. As shown in FIG. 4, turbine inlet 26c is adapted to direct the exhaust of the internal combustion engine to turbocooler turbine 26a. An inlet 26d is adapted to be connected with ambient air and may be provided with a coarse air filter 27a. Turbocooling device 260 of FIG. 4 is provided with an exhaust system portion 230, and the engine exhaust leaving turbine 26a is directed to exhaust system portion 230. Exhaust system portion 230 has an inlet 230a adapted to be connected with a cooling air return which can be ducts 30 as shown in FIGS. 1–3. Exhaust system portion 230 provides a flow of cooling air, as indicated by arrows 230b, which surrounds the engine exhaust leaving turbine 26a and provides an ejector effect, lowering the back pressure at an exit 26f of turbocooler turbine 26a. The addition of cooling air, indicated by arrows 230b, surrounding the flow of engine exhaust gas from outlet 26f of turbine 26a substantially reduces the temperature of the engine exhaust, for example, to temperatures below 500° F. (260° C.) and maintains substantial reduction in the temperature of the outer surfaces of exhaust system portion 230.

The invention provides a system of turbocompounding that permits both the turbochargers and the turbocooler to be optimally designed for their applications. The addition of the turbocooler in internal combustion engine systems of the invention has little or no effect on the transient operation of the internal combustion engine turbochargers. The turbochargers receive the exhaust gas energy prior to the turbocooler and thus can operate and accelerate independently from the turbocooler. The turbochargers for use in systems of the invention may be designed for lowest inertia and highest efficiency since there is no requirement for the addition of a cooling air portion as described in U.S. Pat. No. 3,829,235, or by an additional compressor wheel on the turbocharger shaft to provide the additional cooling air flow. The modification of the turbocharger to provide cooling air flow as described in U.S. Pat. No. 3,829,235 or by the addition of an additional compressor wheel complicates the design of the turbocharger, increases its rotational inertia, decreases its acceleration, and reduces the efficiency of the turbocharger.

The invention provides a means of turbocompounding without the use of reduction gears, and the addition of a turbocooler as in the internal combustion engine systems of the invention allows all of the turbomachines to be designed for optimum performance in their application and to be optimized for highest efficiency. For example, the overall efficiency of a turbocooler 26 of this invention should exceed fifty percent, which is twice the twenty-five percent efficiency obtained with conventional, engine-driven, cooling fans. The fan section of the turbocooler may be designed to provide a low-pressure, high-volume flow of cooling air to the heat exchanger of the internal combustion engine. In such designs, the turbocooler can operate at lower blade tip speeds than the turbocharger and thus achieve high efficiency.

A number of different regulation systems may be incorporated into systems of this invention to vary the volume of cooling air flow produced by the turbocooler. Such regulation systems may include variable inlet guide vanes, variable area turbines, waste gates, pressure relief or throttling valves, and the like. In some applications, the turbocooler may operate without regulation since the exhaust gas energy increases as the cooling air requirement increases; thus, the turbocooler receives greater power and produces a greater volume of cooling air at the same time as the internal combustion engine needs increased flows of cooling air to dissipate the higher heat losses generated by the engine at high engine output. The regulating systems for cooling air may also be provided with inputs proportional to the temperature of ambient air.

The invention thus provides a method of cooling an internal combustion engine using the exhaust gas of the engine, and directing the exhaust gas from the engine to a turbocooler having a turbine and a fan means, driving the turbine and fan means of the turbocooler with the engine exhaust gas, directing ambient air into the turbine-driven fan means of the turbocooler, generating a flow of cooling air with the turbine-driven fan means of the turbocooler, directing the cooling air from the fan means of the turbocooler device to a heat exchanger connected with the internal combustion engine to receive heated coolant from the engine, and cooling of the heated coolant by the cooling air from the turbocooler. In turbocharged engine systems, the exhaust gas is directed to a turbocharger or turbochargers to drive the turbine(s) and compressor(s) of the turbocharger(s); and ambient air is directed to the compressor(s) of the turbocharger(s) and compressed by the compressor(s) of the turbocharger(s) to create charge-air for the engine. The compressed charge-air is directed from the turbocharger compressor(s) to one or more charge-air coolers, and the compressed charge-air is cooled by a flow of cooling air urged through the charge-air cooler(s) by the turbocooler fan means, thus permitting cooled, compressed charge-air to be directed into the cylinders of the internal combustion engine.

Furthermore, the invention provides an oil-only, internal combustion engine system by providing a flow of lubricant to the internal combustion engine as the only fluid to lubricant and to cool the engine, directing the flow of the heated lubricant from the internal combustion engine to an oil cooler for cooling, cooling the heated lubricant with the flow of cooling air from the turbocooler fan means, and directing the cooled lubricant back to the internal combustion engine to lubricate and cool the engine. Finally, in methods of the invention, the output of an engine exhaust system can be cooled by directing the cooling air back to the exhaust system, and using the cooling air, preferably by mixing the cooling air and engine exhaust gas, in the exhaust system to cool the exhaust gas prior to its release and to reduce the temperatures of the downstream exhaust system components.

Thus, the invention provides the methods and apparatus disclosed above in connection with the preferred internal combustion engine system embodiments of FIGS. 1–4. It must be understood, however, that there are other embodiments and variations of the invention which may be developed and that the invention is not limited to the preferred embodiments and best mode of operation currently understood, but is only to be limited by the scope of the following claims.

We claim:

1. An oil-only, internal combustion engine system with an exhaust-driven, cooling system, comprising:
   a multi-cylinder, internal, combustion-engine assembly;
   means for providing a mixture of fuel and air to the internal combustion engine assembly;
   means for carrying the product of the combusted fuel-air mixture from the internal combustion engine assembly;
   means for providing a flow of lubricant to and from the internal combustion engine assembly for lubricating the internal combustion engine assembly and for carrying heat generated by operation of the internal combustion engine assembly away from the internal combustion engine assembly;
   an oil cooler, connected with said means for providing a flow of lubricant, to dissipate the heat carried by said lubricant from the internal combustion engine assembly prior to its return to the internal combustion engine assembly;
   a turbocooler having a turbine connected with the means to carry the product of the combusted fuel-air mixture from the internal combustion engine assembly so that the exhaust gas carried from the internal combustion engine assembly by said exhaust means drives the turbine of the turbocooler, said turbocooler also having a ducted fan means driven by the turbine of the turbocooler, said ducted fan means communicating with atmosphere and generating a ducted flow of cooling air;
   means for directing the flow of cooling air generated by the fan means of said turbocooler through the oil cooler to cool the lubricant and dissipate the heat generated in operation of the internal combustion engine assembly; and
   means for directing the cooling air generated by said turbocooler from said oil cooler to said means for carrying the product of the combusted fuel-air mixture from said internal combustion engine assembly, said means for directing the cooling air including a portion forming a cooling air inlet surrounding said means for carrying the combusted fuel-air product prior to its leaving the exhaust-carrying means, thereby substantially reducing both the temperature and the pressure of the internal combustion engine exhaust.

2. A method of providing cooling for an internal combustion engine using the exhaust gas of the engine, comprising:
   directing the exhaust gas from said engine to a turbocooling device having a turbine and a ducted fan means;
   driving the turbine and ducted fan means of the turbocooling device with the exhaust gas of the internal combustion engine;
   directing ambient air to the turbine-driven ducted fan means of the turbocooling device;
   generating a ducted flow of cooling air with said ducted turbine-driven fan means;
   directing the ducted flow of cooling air from said ducted fan means of the turbocooler to a heat exchanger connected with said internal combustion engine to receive heated coolant from the internal combustion engine;
   cooling said heated coolant with the ducted cooling air from said turbocooler;
   directing the ducted cooling air to an exhaust from the turbocooler device;
   surrounding the exhaust from the turbocooler device with the ducted cooling air; and
   reducing the temperature and pressure in the exhaust system with said ducted cooling air prior to its release to atmosphere.

3. The method of claim 2 wherein the exhaust gas temperature is lowered to a temperature below about 500° F. (260° C.).

4. The method of claim 2 further including the step of driving a gear-reduction device by mechanically linking it to said turbocooling device and thereby providing a driving means for engine accessories.

5. A method of turbocompounding an internal combustion engine, comprising:
   directing a flow of exhaust from the internal combustion engine to a turbocooling device having a turbine portion and a fan portion;
   driving the turbine portion of the turbocooling device with the exhaust gas, thereby driving the fan portion of the turbocooling device;
   generating a flow of cooling air with the fan portion of the turbocooling device;
   driving the turbine portion of a turbocharger with the exhaust gas, thereby driving the compressor portion of the turbocharger;
   compressing ambient air with the compressor of said turbocharger, thereby generating a flow of charge-air for introduction into said engine;
   directing said compressed charge-air through a first charge-air cooling means;
   directing a flow of cooling air through said first charge-air cooling means, thereby lowering the temperature of said charge air;
   compressing said charge-air further with a compressor of a compressor-expander device;
   directing said further compressed charge-air through a second charge-air cooling means;
   directing a flow of cooling air through said second charge-air cooling means, thereby lowering the temperature of said further compressed charge-air;
   directing said cooled, further compressed charge-air from said second charge-air cooling means to an expander of the compressor-expander device;

expanding the cooled, further compressed charge-air with the expander of said compressor-expander device to further cool said cooled, further compressed charge-air;

introducing said further cooled, compressed charge-air into said internal combustion engine; and cooling coolant from said engine with said cooling air.

6. The method of claim 5 wherein the first and second charge-air cooling means comprise air-to-air heat exchangers.

7. The method of claim 5 wherein the cooling air flow produced by said turbocooler is directed initially to the first and second charge-air cooling means and is directed secondly from said first and second charge-air cooling means to a heat exchanger for cooling the coolant employed by said engine.

8. The method of claim 5 including the further step of lastly directing the exhaust gas to an exhaust system located adjacent said turbocooler device and mixing the coolant air and exhaust gas to reduce the final exhaust gas temperature.

9. The method of claim 5 wherein the engine is both cooled and lubricated by a common fluid.

10. The method of claim 9 wherein said common fluid employed by said lubricating and cooling systems of said engine is a synthetic oil.

11. An internal combustion engine system with an exhaust-driven, cooling system, comprising:

a multi-cylinder internal combustion engine assembly;

means for carrying the product of the combusted fuel-air mixture from the internal combustion engine assembly;

means for providing a flow of coolant to and from the internal combustion engine assembly for carrying heat generated by operation of the internal combustion engine assembly away from the internal combustion engine assembly;

a heat exchanger connected with said means for providing a flow of coolant to dissipate the heat carried by said coolant from the internal combustion engine assembly prior to its return to the internal combustion engine assembly;

a turbocooler having an exhaust-driven turbine and ducted fan means for generating a ducted flow of cooling air;

means to direct the ducted flow of cooling air generated by the exhaust-driven ducted fan means of said turbocooler through the heat exchanger to cool the coolant and dissipate the heat losses generated by the internal combustion engine assembly; and means for directing the ducted flow of cooling air generated by said turbocooler from said heat exchanger to an engine exhaust system portion adapted to use the cooling air to surround and cool the engine exhaust gas prior to its leaving the exhaust system.

12. The internal combustion engine system of claim 11 further comprising means for providing a mixture of fuel and air to the internal combustion engine assembly, including a turbocharger having a turbine connected with the means to carry the product of the combusted fuel-air mixture from the internal combustion engine assembly so that the exhaust gas drives the turbine of the turbocharger, said turbocharger also having a compressor driven by the turbine of the turbocharger to deliver a flow of pressurized charge-air to the cylinders of the internal combustion engine assembly; and a first charge-air cooler connected between the charge-air compressor of the turbocharger and the cylinders of the internal combustion engine assembly, said system further comprising means for directing the ducted flow of cooling air generated by the ducted fan means of the turbocooler through the charge-air cooler.

13. The internal combustion engine system of claim 11 wherein the engine exhaust system portion includes an exhaust outlet and a cooling air inlet, said cooling air inlet surrounding said exhaust outlet and directing the cooling air to lower the pressure of the engine exhaust and to mix the cooling air and engine exhaust prior to their leaving the system.

14. An oil-only, internal combustion engine system with an exhaust-driven, cooling system, comprising:

a multi-cylinder, internal, combustion-engine assembly;

means for providing a mixture of fuel and air to the internal combustion engine assembly;

means for carrying exhaust gas from the internal combustion engine assembly;

means for providing a flow of lubricant to and from the internal combustion engine assembly for lubricating the internal combustion engine assembly and for carrying heat generated by operation of the internal combustion engine assembly away from the internal combustion engine assembly;

an oil cooler, connected with said means for providing a flow of lubricant, to dissipate the heat carried by said lubricant from the internal combustion engine assembly prior to its return to the internal combustion engine assembly;

a turbocooler having a turbine connected with the means to carry exhaust gas from the internal combustion engine assembly so that the exhaust gas carried from the internal combustion engine assembly by said exhaust-carrying means drives the turbine of the turbocooler, said turbocooler also having a fan means driven by the turbine of the turbocooler, said fan means communicating with atmosphere and generating a flow of cooling air; and means for directing the flow of cooling air generated by the fan means of said turbocooler through the oil cooler to cool the lubricant and dissipate the heat generated in operation of the internal combustion engine assembly, said means for providing a mixture of fuel and air to the internal combustion engine assembly comprising:

a turbocharger having a turbine connected with the means to carry the exhaust gas from the internal combustion engine assembly so that the exhaust gas carried from the internal combustion engine assembly by said exhaust-carrying means drives the turbine of the turbocharger, said turbocharger also having a charge-air compressor driven by the turbine of the turbocharger to deliver a flow of pressurized charge-air to the cylinders of the internal combustion engine assembly;

a charge-air cooler connected between the charge-air compressor of the turbocharger and the cylinders of the internal combustion engine assembly; and means for directing the cooling air generated by the fan means of the turbocooler through the charge-air cooler.

15. The oil-only internal combustion engine system of claim 14 wherein said means for directing the cooling air generated by the fan means of the turbocooler through the oil cooler includes said means for directing cooling air generated by the fan means of the turbocooler through the first charge-air cooler.

16. The oil-only internal combustion engine system of claim 15 wherein the cooling air is directed from the fan means of the turbocooler first through the charge-air cooler and secondly through the oil cooler.

17. The oil-only internal combustion engine system of claim 16 further comprising means for directing the cooling air generated by said turbocooler from said oil cooler to an engine exhaust system, said engine exhaust system being adapted to use the cooling air from the oil cooler to mix with and cool the engine exhaust gas prior to its leaving the exhaust system, thereby substantially reducing the temperature and pressure of the internal combustion engine exhaust gas.

18. The oil-only, internal combustion engine system of claim 14 wherein the multi-cylinder, internal combustion engine assembly is a V engine with one set of cylinders in each side of the V engine, and said means for carrying exhaust gas from the internal combustion engine assembly includes a first exhaust system for the cylinders in one side of the V engine and a second exhaust system for the cylinders in the other side of the V engine.

19. The oil-only, internal combustion engine system of claim 14 wherein said means for directing the cooling air generated by the fan means of the turbocooler through the charge-air cooler has an input connected with atmosphere and an output connected with the fan means of the turbocooler whereby cooling air flows from atmosphere through the charge-air cooler prior to compression by the fan means of the turbocooler.

20. The oil-only, internal combustion engine system of claim 14 further comprising:
a compressor-expander device having a second charge-air compressor and a charge-air-driven expander;
a second charge-air cooler;
means for directing charge-air from said first charge-air cooler through the second charge-air compressor, the second charge-air cooler, and the charge-air-driven expander and then to the cylinders of the internal combustion engine assembly,
said second charge-air compressor further compressing the charge-air for direction to the second charge air cooler, said second charge-air cooler cooling the further compressed charge-air for direction to the charge-air-driven expander of the compressor-expander device, and said the charge-air-driven expander of the compressor-expander device expanding the cooled further compressed charge-air to provide a flow of cold, compressed charge-air to the cylinders of the internal combustion engine assembly and to drive the second charge-air compressor; and
means for directing the cooling air generated by the fan means of the turbocooler through the second charge-air cooler.

21. The oil-only, internal combustion engine of claim 20 wherein said means for directing the cooling air generated by the fan means of the turbocooler through the oil cooler includes both said means for directing cooling air generated by the fan means of the turbocooler through said first charge-air cooler and said means for directing cooling air generated by the fan means of the turbocooler through said second charge air cooler.

22. The oil-only internal combustion engine system of claim 14 wherein said turbocooler drives a high-speed gear-reduction system, and the output of the high-speed gear-reduction system drives one or more internal combustion engine accessory devices.

23. A method of providing cooling for an internal combustion engine using the exhaust gas of the engine, comprising:
directing the exhaust gas from said engine to a turbocooling device having a turbine and a fan means;
driving the turbine and fan means of the turbocooling device with the exhaust gas of the internal combustion engine;
directing ambient air to the turbine-driven fan means of the turbocooling device;
generating a flow of cooling air with said turbine-driven fan means;
directing the cooling air from said fan means of the turbocooler to a heat exchanger connected with said internal combustion engine to receive heated coolant from the internal combustion engine;
cooling said heated coolant with the cooling air from said turbocooler;
directing the exhaust gas from said engine to a turbocharger device having a turbine and a compressor;
driving the turbine and compressor of the turbocharger with the exhaust gas of the internal combustion engine;
directing ambient air to the compressor of the turbocharger;
compressing the ambient air with the compressor of the turbocharger to create compressed charge-air for said engine;
directing the compressed charge-air from the compressor of the turbocharger to a first charge-air cooler;
generating a flow of cooling air through the first charge-air cooler with the fan means of the turbocooler; and
cooling the compressed charge-air with the flow of cooling air prior to directing the compressed ambient air to the internal combustion engine.

24. The method of claim 23 wherein said cooling means includes ambient air directed initially to the first charge-air cooler and subsequently to the fan means of the turbocooling device, and said cooling air leaving the fan means of the turbocooler is directed to the heat exchanger for engine coolant.

25. The method of claim 23 wherein said cooling air from the fan means of the turbocooler is directed initially to the first charge-air cooler and subsequently from the first charge-air cooler to the heat exchanger for engine coolant.

26. The method of claim 23 wherein the internal combustion engine is a V-type engine with cylinders divided between each side of the V-type engine and with separate exhaust systems for the cylinders on each side of the V-type engine, and exhaust gas from one side of the V-type engine drives one turbocharger and exhaust gas from the other side of the V-type engine drives another turbocharger.

27. The method of claim 23 further comprising the steps of:
  directing the compressed charge-air from said first charge-air cooler to a compressor of a compressor-expander device to further compress the charge-air;
  directing the further compressed charge-air to a second charge-air cooler to further cool the further compressed charge-air;
  directing the cooled further compressed charge-air to the expander of the compressor-expander device;
  expanding the cooled further compressed charge-air with said expander of the compressor-expander device;
  further cooling said charge-air and driving said expander and compressor of the compressor-expander device; and
  directing said further cooled charge-air to said engine.

28. An internal combustion engine assembly with an exhaust-driven, cooling system, comprising:
  a multi-cylinder internal combustion engine assembly;
  means for carrying exhaust gas from the internal combustion engine assembly;
  means for providing a flow of coolant to and from the internal combustion engine assembly for carrying heat generated by operation of the internal combustion engine assembly away from the internal combustion engine assembly;
  a heat exchanger connected with said means for providing a flow of coolant to dissipate the heat carried by said coolant from the internal combustion engine assembly prior to its return to the internal combustion engine assembly;
  a turbocooler having an exhaust-driven fan means for generating a flow of cooling air;
  means to direct the flow of cooling air generated by the exhaust-driven fan means of said turbocooler through the heat exchanger to cool the coolant and dissipate the heat losses generated by the internal combustion engine assembly;
  means for directing the cooling air generated by said turbocooler from said heat exchanger to an engine exhaust system portion adapted to use the cooling air to cool the engine exhaust gas prior to its leaving the exhaust system;
  means for providing a mixture of fuel and air to the internal combustion engine assembly, including a turbocharger having a turbine connected with the means to carry the exhaust gas from the internal combustion engine assembly so that the exhaust gas drives the turbine of the turbocharger, said turbocharger also having a compressor driven by the turbine of the turbocharger to deliver a flow of pressurized charge-air to the cylinders of the internal combustion engine assembly; and
  a first charge-air cooler connected between the charge-air compressor of the turbocharger and the cylinders of the internal combustion engine assembly,
  said system further comprising means for directing the cooling air generated by the fan means of the turbocooler through the charge-air cooler.

29. The internal combustion engine system of claim 28 wherein said means for directing the cooling air generated by the fan means of the turbocooler through the first charge-air cooler includes said means to direct the flow of cooling air generated by the exhaust-driven fan means of said turbocooler through the heat exchanger.

30. The internal combustion engine system of claim 29 wherein the cooling air is directed from the fan means of the turbocooler first through the first charge-air cooler and secondly through the heat exchanger.

31. The internal combustion engine system of claim 28 wherein said means for directing the cooling air generated by the fan means of the turbocooler through the first charge-air cooler has an input connected with atmosphere and an output connected with the fan means of the turbocooler whereby cooling air flows from atmosphere through the charge-air cooler prior to compression by the fan means of the turbocooler.

32. An internal combustion engine assembly, comprising:
  a multi-cylinder internal combustion engine producing exhaust gas;
  means for providing flows of a plurality of fluids in operation of the internal combustion engine assembly;
  means for carrying the exhaust gas from the internal combustion engine;
  a turbocooler communicating with said means for carrying the exhaust gas and including ducted fan means driven by said exhaust gas for generating a flow of cooling air;
  a plurality of heat exchangers connected with said means for providing flows of a plurality of fluids, with a separate heat exchanger for each of said plurality of fluids;
  conduit means to direct the cooling air from said ducted fan means of said turbocooler through each of the plurality of heat exchangers to cool each of the plurality of fluids provided in operation of the internal combustion engine assembly.

33. The internal combustion engine assembly of claim 32 wherein said means for providing flows of a plurality of fluids comprise means providing a flow of coolant for the internal combustion engine and means providing a flow of charge-air for the cylinders of the internal combustion engine.

* * * * *